(12) United States Patent
Zheng et al.

(10) Patent No.: US 8,526,969 B2
(45) Date of Patent: Sep. 3, 2013

(54) NEARBY CONTACT ALERT BASED ON LOCATION AND CONTEXT

(75) Inventors: Yu Zheng, Beijing (CN); Sharad Agarwal, Seattle, WA (US); Alex Hehmeyer, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 12/480,511

(22) Filed: Jun. 8, 2009

(65) Prior Publication Data

US 2010/0311395 A1    Dec. 9, 2010

(51) Int. Cl.
*H04W 4/02*     (2009.01)
*H04M 3/42*     (2006.01)

(52) U.S. Cl.
USPC ............. 455/456.2; 455/456.1; 455/457; 370/328; 380/283

(58) Field of Classification Search
USPC ............. 455/456.2, 456.1, 457; 370/328; 380/283
See application file for complete search history.

(56) References Cited

U.S. PATENT DOCUMENTS

| | | | |
|---|---|---|---|
| 6,968,179 B1 | 11/2005 | De Vries | |
| 7,409,429 B2 | 8/2008 | Kaufman et al. | |
| 7,558,731 B1 * | 7/2009 | Hodjat et al. | 704/257 |
| 7,844,671 B1 * | 11/2010 | Lawler et al. | 709/206 |
| 2003/0182394 A1 | 9/2003 | Ryngler et al. | |
| 2005/0136903 A1 | 6/2005 | Kashima et al. | |
| 2005/0177614 A1 * | 8/2005 | Bourne | 709/200 |
| 2006/0085419 A1 * | 4/2006 | Rosen | 707/9 |
| 2007/0015518 A1 * | 1/2007 | Winter et al. | 455/456.1 |
| 2007/0030824 A1 * | 2/2007 | Ribaudo et al. | 370/328 |
| 2008/0032666 A1 | 2/2008 | Hughes et al. | |
| 2008/0086261 A1 | 4/2008 | Robinson et al. | |
| 2008/0215623 A1 * | 9/2008 | Ramer et al. | 707/104.1 |
| 2010/0004005 A1 * | 1/2010 | Pereira et al. | 455/457 |
| 2010/0057562 A1 * | 3/2010 | Gabbay | 705/14.52 |
| 2010/0278345 A1 * | 11/2010 | Alsina et al. | 380/283 |

FOREIGN PATENT DOCUMENTS

WO    0235865 A1    5/2002

OTHER PUBLICATIONS

Charny, Ben, "New Cell Feature Helps Find Friends", Retrieved at <<http://news.cnet.com/2100-1033-946224.html>>, Jul. 25, 2002, pp. 5.

Dinovitzer, Doron, "Location-Based Services Driving Mobile Social Networking", Retrieved at <<http://www.ragaanalytics.com/blog/2008/10/location-based-services-driving-mobile-social-networking>>, Oct. 14, 2008, pp. 7.

* cited by examiner

*Primary Examiner* — Meless N Zewdu
*Assistant Examiner* — Jean Chang
(74) *Attorney, Agent, or Firm* — Turk IP Law, LLC

(57) ABSTRACT

Attributes including presence and organization information for contacts of a subscriber are used in determining a subset of contacts matching a predefined criterion. Determined subset of contacts is sent as an alert to notify the subscriber to the subsets' nearby proximity.

17 Claims, 8 Drawing Sheets

NEARBY CONTACT ALERT BASED ON LOCATION AND CONTEXT

BACKGROUND

Telecommunication services evolved substantially in a relatively short time with the integration of computing technologies into telecommunication systems and devices. Cellular telephones are an illustrative example. The services provided through a cellular phone such as video streaming, image acquisition and transfer, music distribution, financial transactions, and many others are examples of activities that would have been impossible through conventional phone technologies.

The rapid development of capabilities and services provided through communication devices are not limited to cellular phones. Newer systems combine a variety of short range and long range communication capabilities over a number of networks including traditional phone networks, wireless networks, and similar ones. Telecommunication end devices as well as support devices and programs for such newer systems are more similar to computer networks than conventional telephone networks. Thus, a large number of capabilities may be added to those already provided by modern telecommunication devices and networks.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a subscriber of an enhanced communication system with an alert about a subset of nearby contacts matching a predefined criterion. The criterion may be based on frequency or context of past interactions with the nearby contacts or similar attributes. Location information for both the subscriber and the contacts may be obtained from a variety of data sources similar to the subscriber and contact attribute information.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
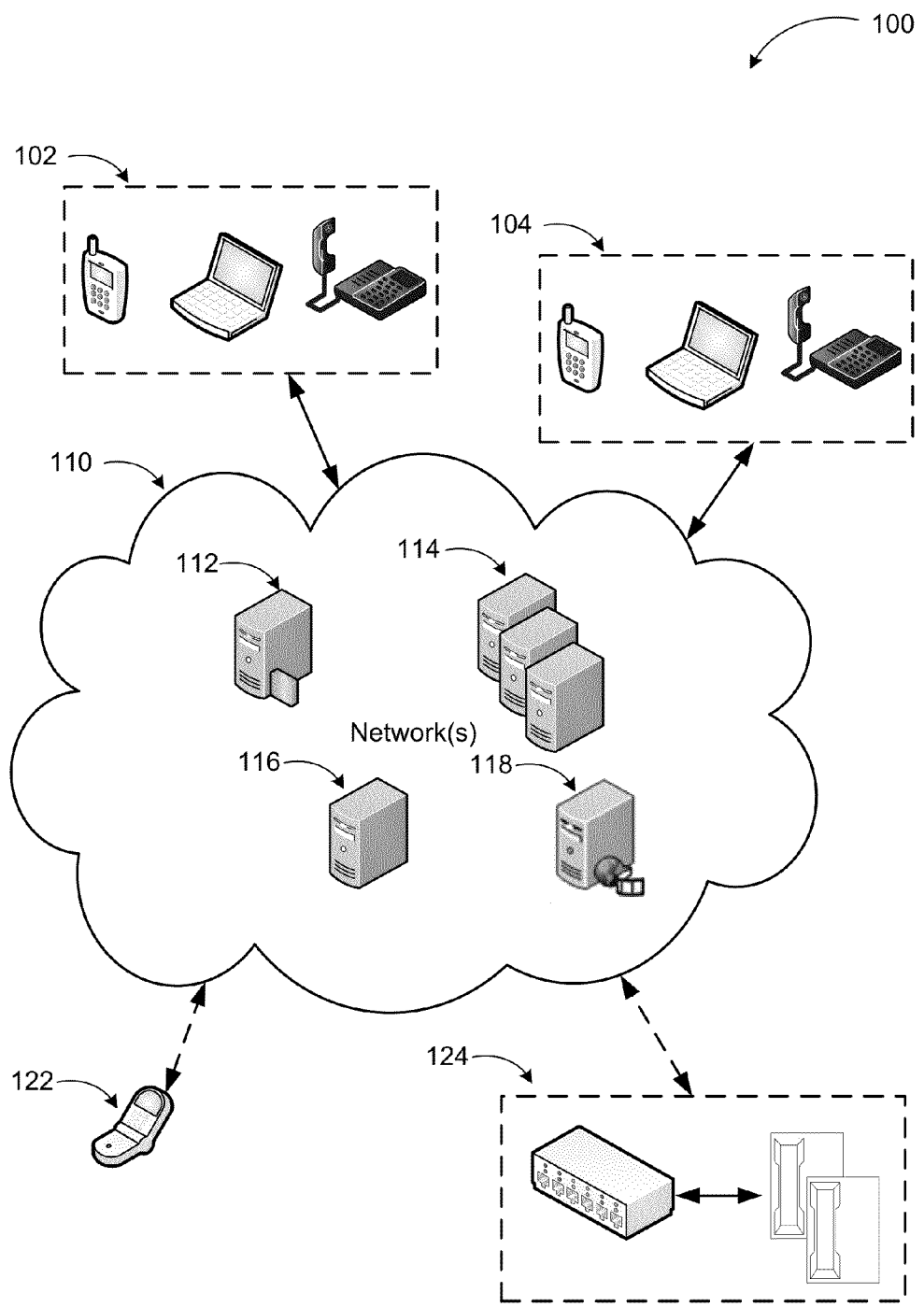
FIG. 1 is a diagram illustrating an example unified communications system.

As briefly described above, predefined criteria may be used to filter and determine nearby contacts and alert a subscriber to the availability of the nearby contacts. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing presence and location based entity presentation. Examples of platforms include, but are not limited to, a hosted service executed over a plurality of servers, an application executed on a single server, and comparable systems. The term "server" refers to a computing device executing one or more software programs typically in a networked environment. More detail on these technologies and example operations is provided below.

Referring to FIG. 1, diagram 100 of an example unified communications system is illustrated. A unified communication system is an example of modern communication systems with a wide range of capabilities and services that can be provided to subscribers. A unified communication system is a real-time communications system facilitating instant messaging, presence, audio-video conferencing, and web conferencing functionality.

In a unified communication ("UC") system such as the one shown in diagram 100, subscribers may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Presence functionality enables the system to route calls to a subscriber and to anyone of the client devices assigned to the subscriber based on default and/or subscriber set policies. For example, if the subscriber is not available through a regular phone, the call may be forwarded to the subscriber's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other subscribers in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, subscribers may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

The SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

Because end devices in a UC system according to embodiments can provide and receive a variety of information about their status (hardware and/or software) and a subscriber's status, a number of additional features may be incorporated into communication capabilities. For example, a subscriber's location, availability, their preferences, and similar information may be exchanged prior to or during communication. The end devices in such a system may also receive information from other sources like a GPS server or a cellular system device including location information for other subscribers. Thus, a subscriber may receive an alert about nearby contacts (including, but not limited to, subscribers) determined by filtering based on a predefined contextual criterion.

While the example system in FIG. 1 has been described with specific components such as mediation server, A/V server, and similar devices, embodiments are not limited to these components or system configurations and can be implemented with other system configuration employing fewer or additional components. Functionality of systems enabling alerting of a user about nearby contacts based on location and context may also be distributed among the components of the systems differently depending on component capabilities and system configurations.

Figure 2:
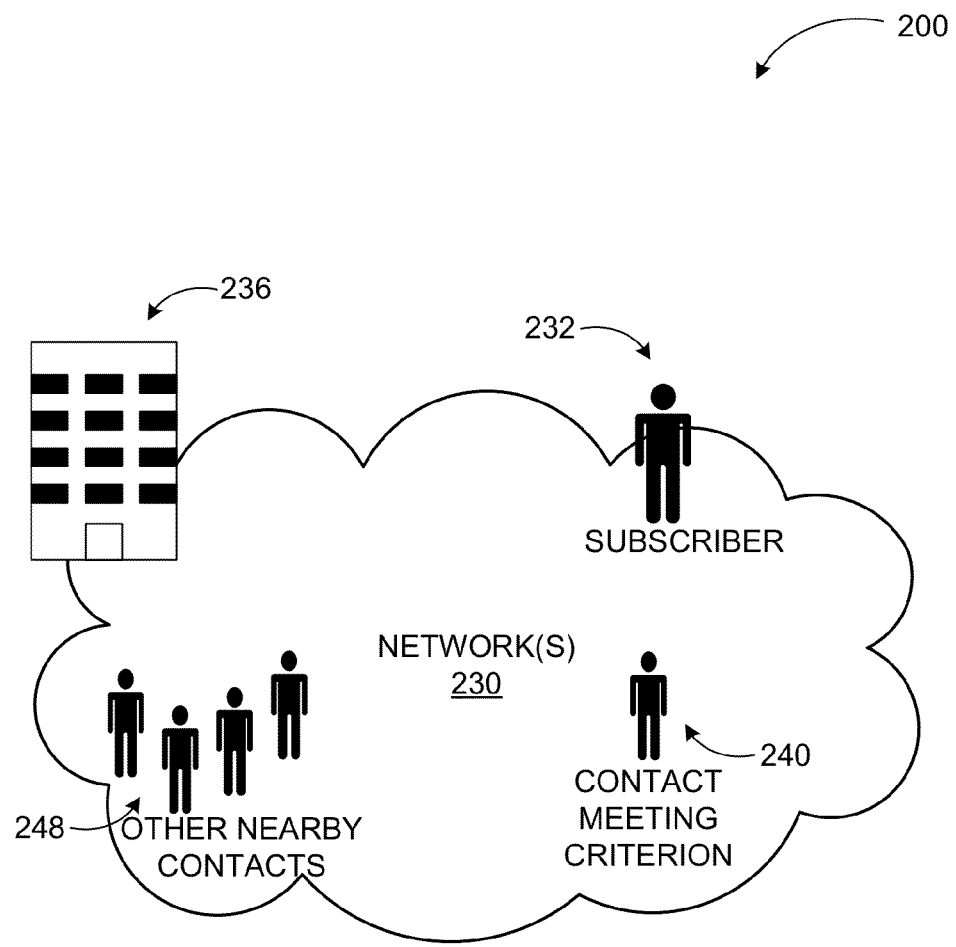
FIG. 2 illustrates example scenarios where a predefined criterion may be utilized to filter nearby contact entities for presentation to the subscriber according to embodiments.

FIG. 2 illustrates example scenarios in diagram 200, where location and context associated with nearby contacts may be utilized in alerting the subscriber about the nearby contacts of interest according to embodiments. Determination of which nearby contacts to notify the subscriber about presented here are for illustration purposes only and do not constitute a limitation on embodiments. Other determination approaches may certainly be implemented using the principles described herein.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services may be enabled in conjunction with the available communications. Furthermore, a variety of communication modes such as voice communication, video communication, instant messaging, electronic mail, data sharing, application sharing, whiteboard sharing, and similar modes, may be available depending on the capabilities of each device and applications available on each device.

Some of those advanced services may take advantage of the subscriber's attributes as well as contacts' attributes in generating an alert about a subset of nearby contacts from a contact list that may be filtered and ordered. For example, to provide the alert about the subset of nearby contacts, the location of the subscriber may be determined. The subset of nearby contacts may be determined from a list of contacts based on a predefined criterion. The criterion may be based on an attribute of the subscriber and attributes of the nearby contacts defined by at least a default rule and a subscriber preference. The alert may be provided to the subscriber associating the subscriber with the subset of the nearby contacts.

The predefined criterion for generating the alert may include selecting contacts from a group of contacts within an organization, from the subscriber's social group, and a from subscriber defined group. The contacts' relationship to subscriber may be determined from an organizational directory, subscriber's directory, and a third party directory. Other attributes such as frequency of interaction or staleness of interaction within a predefined period may factor in the determination for generating the alert about nearby contacts. Additionally, embodiments may determine future travel for subscriber and prepare and alert the subscriber about expected nearby contacts for the future travel. Future travel determination may include comparing the subscriber's future itinerary with the contacts' future itineraries and providing an alert to subscriber about a subset of contacts that may be nearby during the future travel. The itinerary components may include calendar attributes, destination attributes, route attributes, and others.

The location of the subscriber and the nearby contacts may be determined in a variety of ways. The location may be determined from Global Positioning Service (GPS) information, cellular network information, and information obtained from an active connection of the contact to a non-cellular network. An organization as used herein may refer to any group of people such as an enterprise, a company, or even subscribers of a mailing list. Furthermore, a system according to embodiments may determine a subscriber's membership in an organization from subscription(s) to particular directories, mailing lists, etc.

The provided alert may be in visual and audible form. The alert may additionally include information such as an address, a contact number, an email address, an organizational structure, an expertise, an availability status, a schedule, a location, and a membership group. The alert may be determined based on the criterion defined by explicit subscriber preferences and/or automatically inferred rules associated with location and attributes of the nearby contacts.

According to other embodiments, the nearby contacts matching the predefined criterion may be determined by employing a branch-and-bound algorithm, a progressive improvement algorithm, and a heuristic algorithm. The alert may be presented through a user interface displaying the nearby contacts meeting the criterion and associated actionable items employing a graphical shape-based scheme, an icon scheme, a color scheme, or a text-formatting scheme. Moreover, the subscriber may be enabled to accept or reject communication with the presented nearby contacts.

Similarly other services associated with enhanced communications such as scheduling meetings/conference calls, transmitting message, and comparable ones may be performed based on the location and presence information. Presence information refers to multiple attributes of subscriber and contacts including dynamic information such as availability, schedule, device/application capabilities, as well as static information such as organizational attributes (e.g. member of particular project teams, groups), address, contact information, and professional attributes (e.g. expertise).

A subscriber may take advantage of the enhanced features provided by a system implementing embodiments in different scenarios. For example a subscriber may be in various locations at different times, such as in a business place 236 (subscriber 232). Other contacts 248 may be available for the subscriber but not relevant to subscriber's predefined criterion. For example, subscriber 232 may find co-workers attending a meeting at business place 236. The subscriber may set a default rule indicating a meeting topic as the predefined criterion. List of contacts may be filtered and a determination may be made which of the nearby contacts match the predefined criterion (e.g. contact 240). And, an alert may be sent to subscriber 232 indicating availability of contact 240 meeting the criterion.

According to another scenario, the criterion may be based on frequency of interaction. Subscriber 232 may not have met contact 240 for some time, but have corresponded regularly regarding a project. A system according to embodiments may determine by mining subscriber 232's email data that contact 240 is of interest and notify subscriber 232 that contact 240 is nearby.

Figure 3:
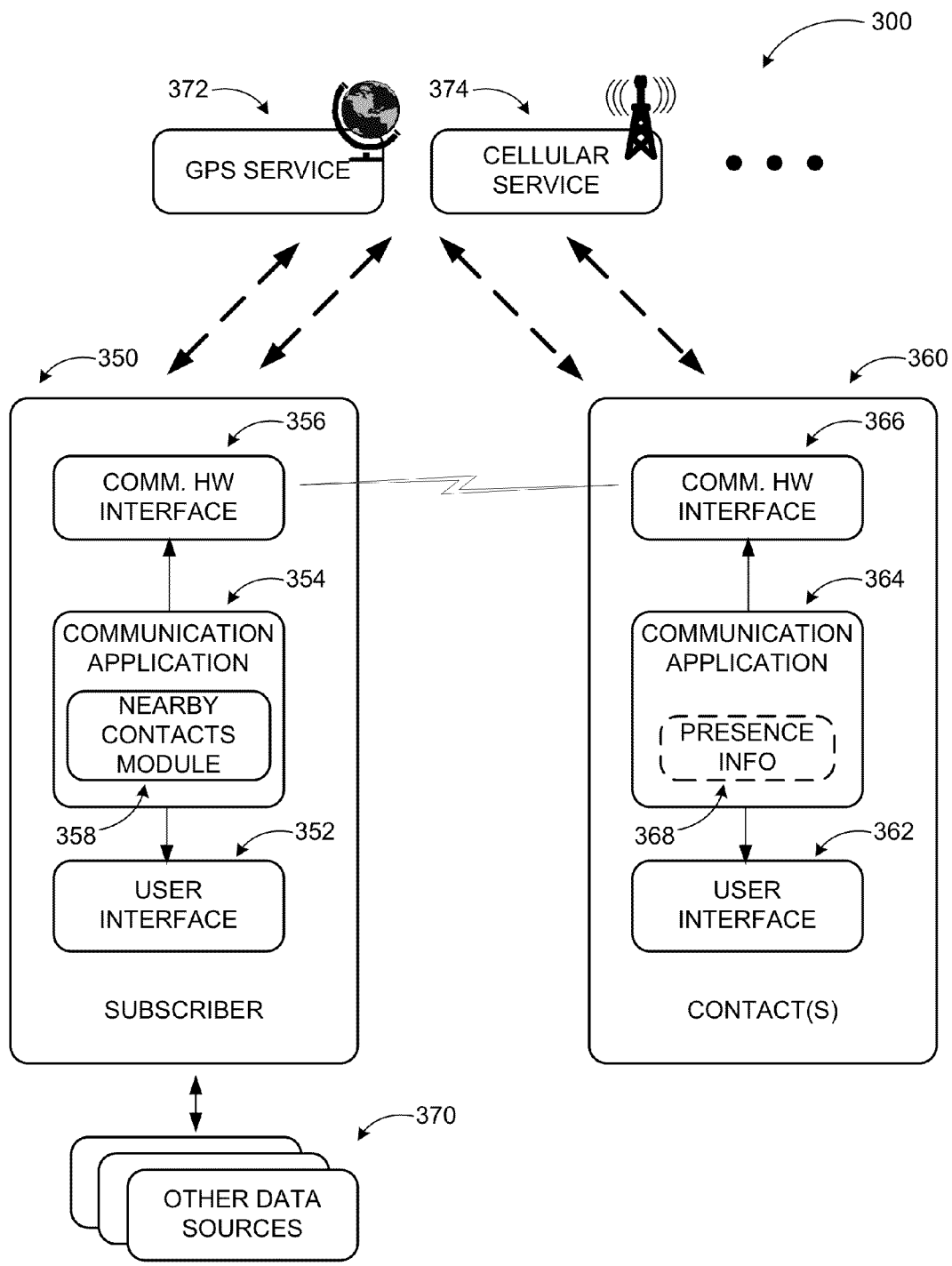
FIG. 3 illustrates communication application architectures for the subscriber and the nearby contacts for implementing context and location based alert presentation.

FIG. 3 illustrates diagram 300 of communication application architectures for the subscriber and the nearby contact implementing attribute and location based alert presentation. As discussed above, alerts about nearby contacts from a filtered and sorted subset of contact list may be provided based on location and context information. Communication applications providing enhanced communications and associated services with alert features according to embodiments may be individual applications executed on end devices interacting with other applications or they may be part of a hosted service remotely providing the services to connected subscribers.

On the subscriber side (350), communication application 354 may include a presence information module 358 for maintaining information related to presence attributes of the subscriber such as subscriber's dynamic (and static) information (address, contact numbers, professional attributes, schedule, a location of the subscriber, and similar information. A portion of the information may be obtained from local or remote resources such as GPS service 372, cellular service 374, local gyro-sensors (not shown), wireless network identifiers, and comparable resources. Presence information including the location of the subscriber may then be published (e.g. through a presence server or another entity within the system) to make nearby contacts aware. User interface 352 may be used to enable subscriber to enter additional information, make selections, and so on. Communication hardware interface 356 provides connection with available hardware components such as transceivers for various communication modes to communication application 354. Of course, all or a portion of the contact information for subscriber may also be maintained and published by a directory server of the communication system. Subscriber may also be privy to other data sources 370 such as other directories, address books, and any other data source that may provide information regarding the contacts and their relationship to the subscriber.

On the contact(s) side (360), a parallel structure includes communication hardware interface 366, user interface 362, and communication application 364. Presence based processing module 368, which may be a separate application or part of communication application 364, is configured to determine the location of contacts through any of the above discussed approaches such as GPS 372 or cellular service 374, and provide the presence information to others such as the subscriber. Thus, a contact may determine the location of other contacts through one or more servers within or outside the system such as presence servers or any of the other entities listed above. If a contact is within a predefined vicinity of the subscriber, he/she may be included in a nearby contacts list of the subscriber. The list may be ordered based on availability, expertise, capabilities, or scheduling status of the nearby contacts. Furthermore, the location and presence information may be used to determine which communication mode(s) can be enabled/recommended to the subscriber or the contact(s).

An alert for the subscriber may be determined by the nearby contacts module 358 based on location and context of the contacts. Criteria for the determination may be based on default rules, subscriber defined rules, or automatic. Examples include organizational relationship based rules (e.g. "Notify me when my boss is nearby"), personal rules (e.g. "Notify me when my spouse is nearby"), or inferred rules (e.g. "Notify when a contact participating in a recent email discussion, who is typically not nearby, is nearby"), and comparable ones.

While specific computing devices and communication related tasks have been described above, these are for illustration purposes only and do not constitute a limitation on embodiments. Many other hardware environments and communication related tasks may be implemented using the principles described herein.

Figure 4:
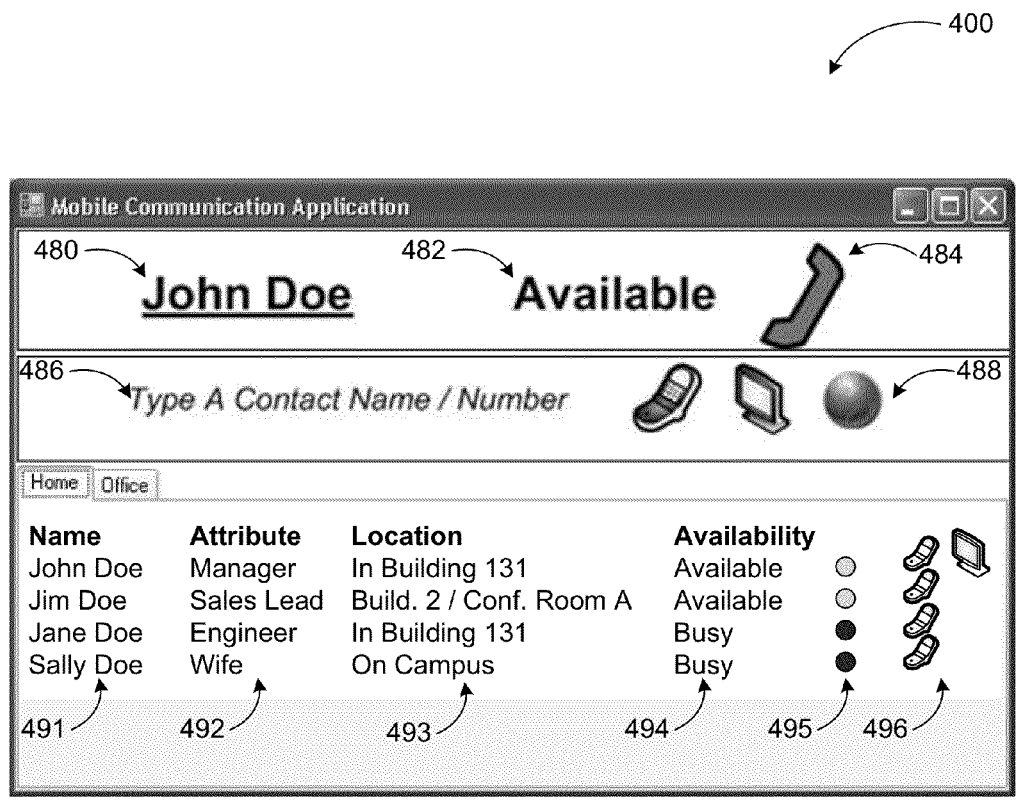
FIG. 4 is a screenshot of an example communication application user interface illustrating location and context based alerting according to embodiments.

FIG. 4 is a screenshot of an example communication application user interface 400 illustrating location and context based filtering and alerting according to embodiments. While a user interface for such an application may take any form and include a variety of elements, example ones are shown in FIG. 4 to illustrate aspects of the present disclosure.

The user interface 400 includes subscriber name 480 and current status 482 along with an icon for initiating a call (484). Also included is an input area 486 for entering a contact name or number to place a call (initiate video communication, send an instant message, and comparable communications) and icons of available communication modes 488 on the particular device executing the communication application.

According to one embodiment, the user interface may present an aggregated contact list generated based on the subscriber's (identified by subscriber name 480) location. The user interface may list the contact list (such as those in a favorite contacts list) by name (491), expertise (492), location and distance from the subscriber (493), and availability (494). Graphic schemes that also employ color schemes may be used to underline the status (495) of each contact as well as to display available communication modes (496). While the contacts in the example user interface are all human, non-human resources may also be listed in the contact list. The user interface may be dynamically modified to display appropriate icons for those cases.

A filtered and ordered subset of contacts according to embodiments may be updated upon request by the subscriber, periodically, or upon receiving a presence status change for one of the contacts. While the example user interface is for a communication application, other functionality may also be provided (such as printing information associated with a contact) by providing a link to relevant application(s).

Figure 5:
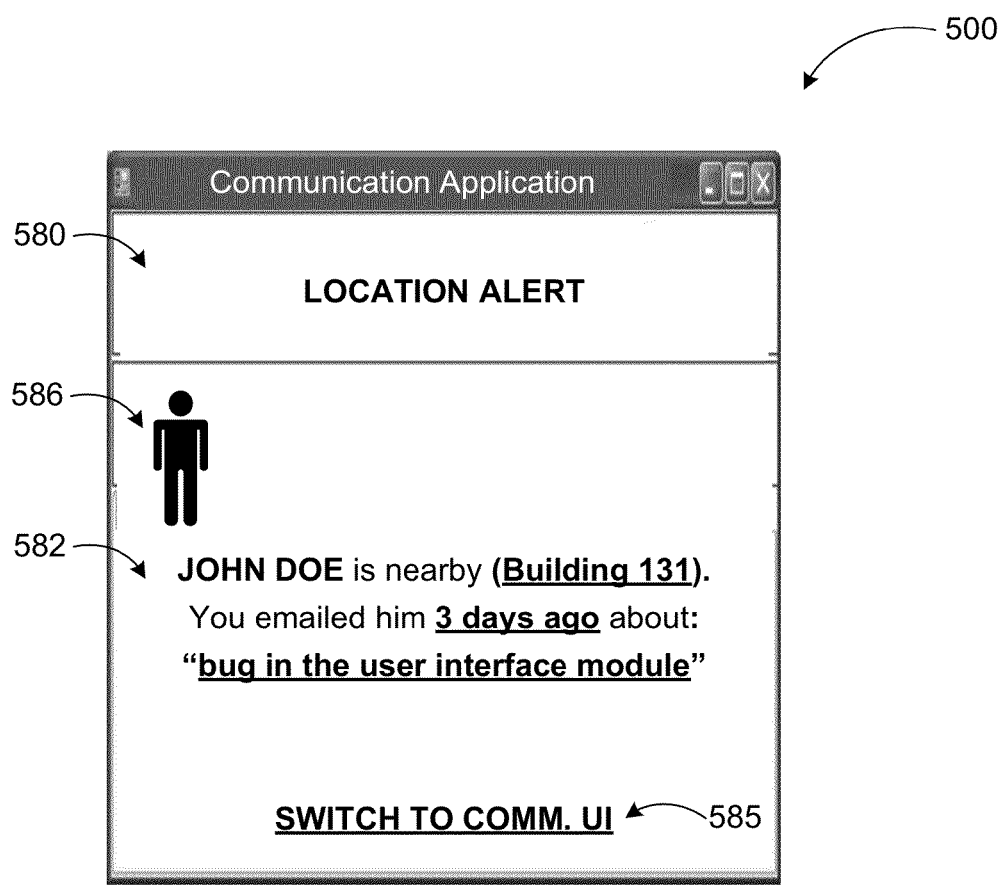
FIG. 5 is a screenshot of an example alert sent to a subscriber about a nearby contact determined upon filtering based on a predefined criterion.

FIG. 5 is an example alert sent to the subscriber about nearby contacts. The alert may have a title 580 indicating availability of a nearby contact of interest. The alert may display the picture of contact 586. The picture may be an icon, a small picture, a thumbnail presentation and other similar presentation. The picture may be represented using a color or graphic scheme. A message 582 indicating the details of the nearby contact may be displayed. The message may contain name of the contact, location of the contact, a previous interaction with the contact, and the topic of the previous interaction, thus providing the context for the alert. Various portions of the message may be actionable items such as a clickable hyperlink of the contact location, which may display the subscriber a map of the location. Time information on the message may be actionable such as launching an email program displaying all the emails exchanged with the contact from the indicated time period. The message topic information may be actionable as well such as launching an email program displaying particular emails matching the topic information. Moreover, the alert 500 may display an actionable item 585 to switch to a communication application to initiate communication with the contact. Although example 500 displays an alert with a single contact, embodiments are not limited to an alert containing single contact and the alert may contain a subset list of contacts matching the predefined criterion.

Figure 6:
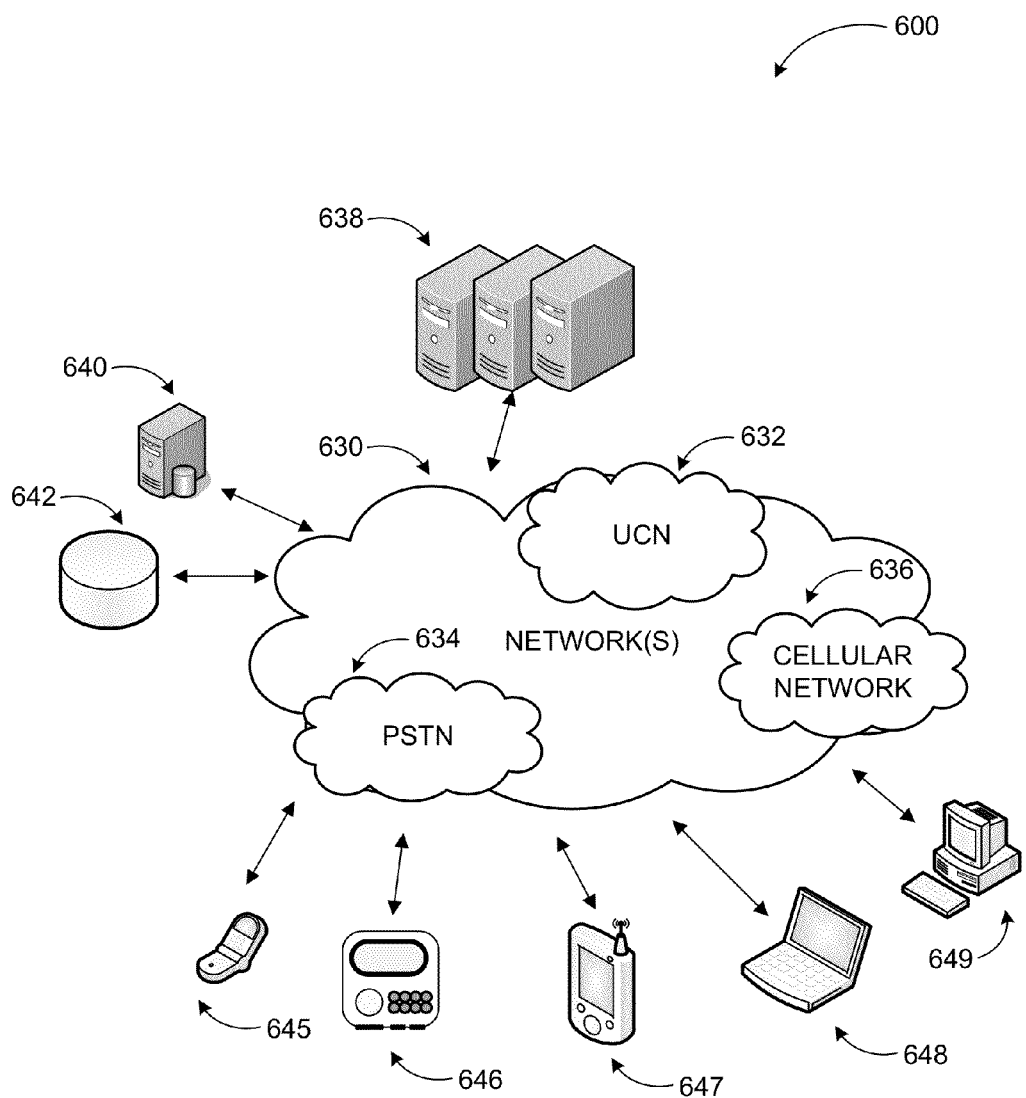
FIG. 6 is a networked environment, where a system according to embodiments may be implemented.

FIG. 6 is an example networked environment, where embodiments may be implemented. A platform providing enhanced communication services with above discussed features may be implemented via software executed over one or more servers 638 such as a hosted service. The platform may communicate with consuming applications on individual computing devices such as a cellular phone 645, smart automobile console 646, a handheld computer 647, a laptop computer 648, and desktop computer 649 ('client devices') through network(s) 630.

As discussed previously, client devices 645-649 are used to facilitate communications through a variety of modes between subscribers of the enhanced communication service. A communication application executed in one of the client devices or by one of the server 638 may determine a contact of interest based on the contact's proximity to a subscriber and a context for determining the contact to be a contact of interest. The communication application may then alert the subscriber about the location and availability of the contact of interest. Information associated with subscribers and facilitating communications may be stored in one or more data stores (e.g. data store 642), which may be managed by any one of the servers 638 or by database server 640.

Network(s) 630 may comprise any topology of servers, clients, Internet service providers, and communication media. A system according to embodiments may have a static or dynamic topology. Network(s) 630 may include a secure network such as an enterprise network, an unsecure network such as a wireless open network, or the Internet. Network(s) 630 may also comprise a plurality of distinct networks such as UC network 632, PSTN 634, and cellular network 636. Network(s) 630 provides communication between the nodes described herein. By way of example, and not limitation, network(s) 630 may include wireless media such as acoustic, RF, infrared and other wireless media.

Many other configurations of computing devices, applications, data sources, and data distribution systems may be employed to implement a system for using subscriber location and contact attributes in generating an alert nearby contacts of interest. Furthermore, the networked environments discussed in FIG. 6 are for illustration purposes only. Embodiments are not limited to the example applications, modules, or processes.

Figure 7:
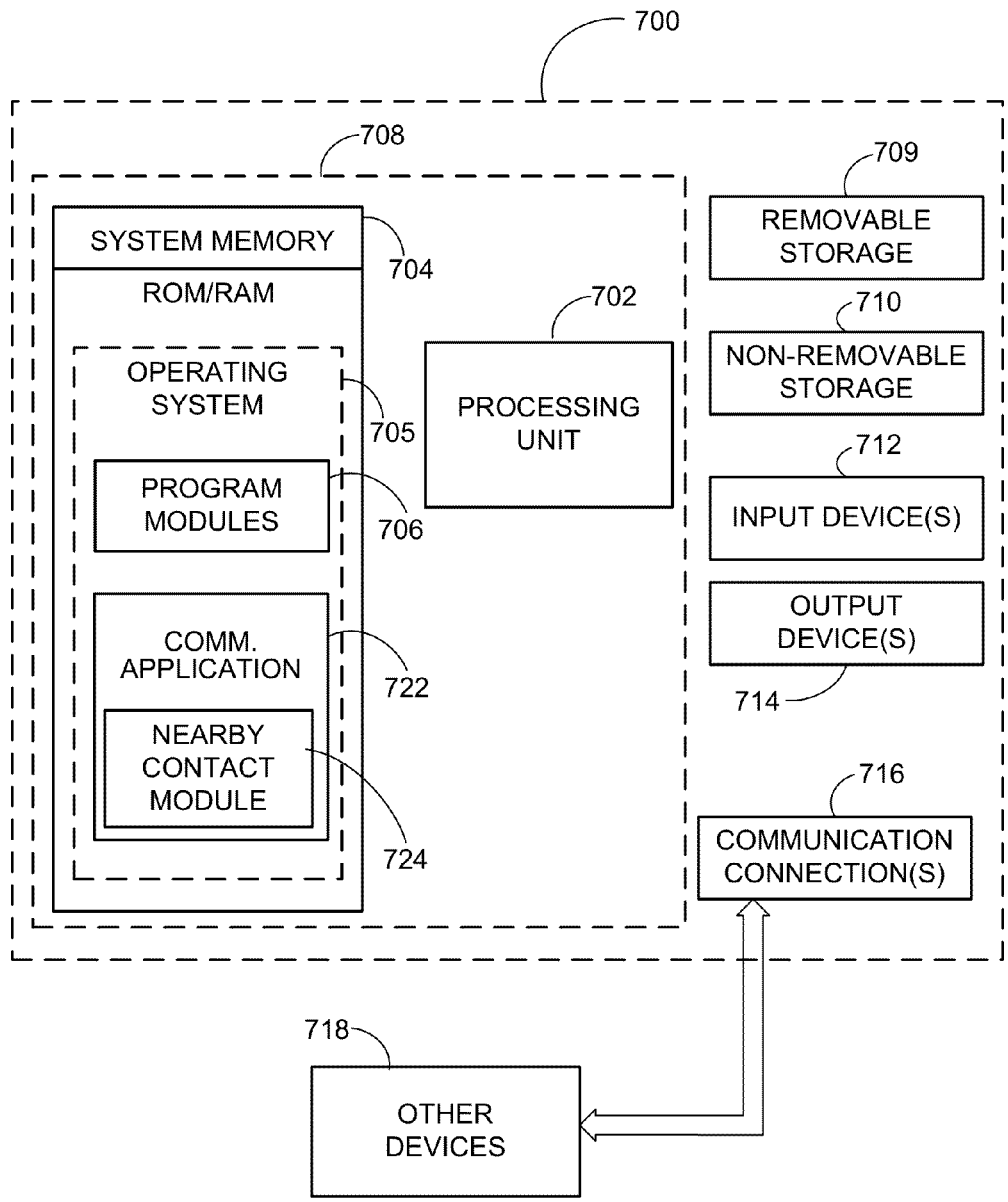
FIG. 7 is a block diagram of an example computing operating environment, where a communication application according to embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computer 700. In a basic configuration, computer 700 may include at least one processing unit 702 and system memory 704. Computer 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as program modules 706, communication application 722, and nearby contact module 724.

Communication application 722 and nearby contact module 724 may be separate applications or integral modules of a hosted service that provides communication services to client applications/devices. Nearby contact module 724 may analyze location information for a subscriber using computer 700 and presence data (e.g. location) for a contact received from one or more data source applications. Based on the analysis results, nearby contacts module 724 may filter the nearby contacts based on a predefined criterion such as a context of relationship between the subscriber and the contact, and send an alert to the subscriber about the nearby contact. This basic configuration is illustrated in FIG. 7 by those components within dashed line 708.

Computer 700 may have additional features or functionality. For example, the computer 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer 700. Any such computer readable storage media may be part of computer 700. Computer 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computer 700 may also contain communication connections 716 that allow the device to communicate with other devices 718, such as over a wireless network in a distributed computing environment, a satellite link, a cellular link, and comparable mechanisms. Other devices 718 may include computer device(s) that execute communication applications, GPS satellites providing GPS data, cellular towers providing external data and/or positioning data, and comparable devices. Communication connection(s) 716 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
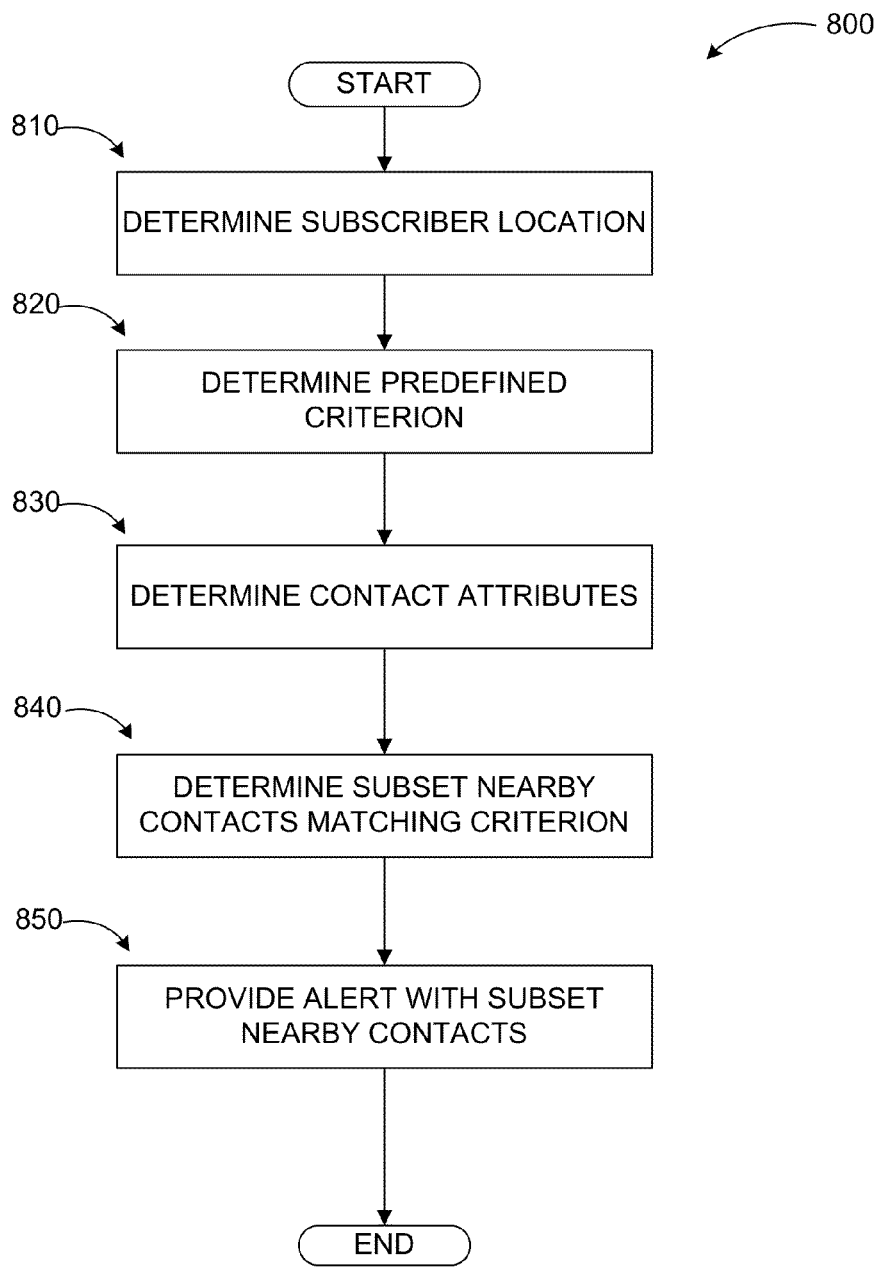
FIG. 8 illustrates a logic flow diagram for alerting a subscriber of nearby contacts determined upon filtering based on a predefined criterion.

FIG. 8 illustrates a logic flow diagram of process 800 for alerting a subscriber of nearby contacts determined upon filtering based on a predefined criterion. Process 800 may be implemented as part of a unified communication system communicator application such as the one described above in conjunction with FIGS. 3 and 4.

Process 800 begins with operation 810, where subscriber location is determined through a variety of approaches including, but not limited to, GPS information, cellular network information, and other network information. At operation 820, a predefined criterion is determined. The predefined criterion may include being part of a subscriber defined group, having interacted with the subscriber in the past, and similar ones. At operation 830, contacts' attributes are determined. Contacts' attributes may include organizational relationships, relationships within the context of a particular topic, and the like. At operation 840, a subset of contacts is determined according to the predefined criterion and based on the subscriber's location.

The predefined criterion may be determined based on a group of contacts within an enterprise directory or a context of prior conversations with the contacts. The criterion may be customized by the subscriber through selection or modification of default rules. An alert including the subset of contacts is sent to the subscriber at operation 850. Moreover, the subscriber may be enabled to select between accepting and rejecting a communication session invitation from one of the nearby contacts. According to some embodiments, the group of nearby contacts satisfying the criterion may be updated in response to a request by the subscriber, expiration of a predefined period, or receiving a presence status change for one of the contacts.

The operations included in process 800 are for illustration purposes. Using subscriber location and contacts' presence attributes in alerting the subscriber about nearby contacts of interest may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing a nearby contact alert, the method comprising:
   determining a future travel and an expected future location of a subscriber based on the subscriber's future itinerary based on an analysis of presence data for the subscriber by a nearby contact module;
   determining a subset of expected nearby contacts by filtering the subscriber's contacts at the nearby contact module based on the expected future location of the subscriber, future itineraries of the subscriber's contacts, a predefined criterion defined by a context of a relationship of the subscriber with the expected nearby contacts, and an inferred rule based on a recent communication between the subscriber and the expected nearby contacts, wherein the criterion is based on an attribute of the subscriber and attributes of the expected nearby contacts and wherein the criterion is customized by the subscriber through selection and modification of default rules; and providing an alert to the subscriber associated with the expected nearby contacts during the future travel, wherein the alert includes information associated with the expected nearby contacts and a context for the alert in form of at least one of: a previous interaction with the expected nearby contacts and a topic of the previous interaction.

2. The method of claim 1, wherein the predefined criterion is determined based on at least one from a set of: a group of contacts within an enterprise directory and a context of prior conversations with the contacts.

3. The method of claim 1, wherein the attribute of the subscriber and the attributes of the expected nearby contacts are determined based on at least one from a set of: an enterprise directory, a subscriber directory, and a third party directory.

4. The method of claim 1, wherein the attribute of the subscriber and the attributes of the expected nearby contacts include a frequency of interaction within a predefined period.

5. The method of claim 1, wherein the attribute of the subscriber and the attributes of the expected nearby contacts include a staleness of interaction within a predefined period.

6. The method of claim 1, wherein the expected future location of subscriber and expected future locations of the expected nearby contacts are determined based on at least one from a set of: Global Positioning Service (GPS) information, cellular network information, information obtained from an active connection a non-cellular network, and presence information.

7. The method of claim 1, wherein the alert is a visual alert.

8. The method of claim 1, wherein the alert is an audio alert.

9. The method of claim 1, wherein the alert includes additional information including at least one from a set of: an address, a contact number, an email address, an organizational structure, an expertise, an availability status, a schedule, a location, and a membership group.

10. A system for utilizing location and presence attributes for providing a nearby contact alert, the system comprising:

a server and a communication management framework, the server configured to execute the communication management framework and further configured to:

determine a future travel and an expected future location of a subscriber based on the subscriber's future itinerary based on an analysis of presence data for the subscriber by a nearby contact module;

determine a subset of expected nearby contacts by filtering the subscriber's contacts at the nearby contact module based on the expected future location of the subscriber, future itineraries of the subscriber's contacts, a predefined criterion defined by a relationship of the subscriber with the expected nearby contacts, and an inferred rule based on a recent communication between the subscriber and the expected nearby contacts, wherein the criterion is based on an attribute of the subscriber and attributes of the expected nearby contacts and wherein the criterion is customized by the subscriber through selection and modification of default rules;

display a list of the subset of expected nearby contacts to the subscriber, wherein the subset of expected nearby contacts are selected from at least one from a set of: a group of contacts within an organization, a social group, and a subscriber defined group; and provide an alert to the subscriber associated with the expected nearby contacts during the future travel, wherein the alert includes name and location of the expected nearby contacts and a context for the alert in form of at least one of: a previous interaction with the expected nearby contacts and a topic of the previous interaction and wherein the alert is provided to a client device executing a communication mode including one or more of: voice communication, video communication, instant messaging, electronic mail, data sharing, application sharing, and whiteboard sharing.

11. The system of claim 10, wherein the predefined criterion is defined by explicit subscriber preferences and automatically inferred rules associated with the attributes of the expected nearby contacts.

12. The system of claim 10, wherein the determination of the subset of expected nearby contacts employs at least one from a set of: a branch-and-bound algorithm, a progressive improvement algorithm, and a heuristic algorithm.

13. The system of claim 10, further comprising at least one from a set of: a smart phone, a laptop, a desktop computer, a handheld computer, and a smart automobile console executing a communication application within the communication management framework for providing the alert to the subscriber and facilitating communications.

14. The system claim 10, wherein the subscriber is enabled to select one of accepting and rejecting a communication session invitation from one of the subset of the expected nearby contacts.

15. The system of claim 10, wherein the subset of expected nearby contacts is updated in response to one of: a request by the subscriber, expiration of a predefined period, and receiving a presence status change for one of the contacts.

16. The system of claim 10, wherein the location of the subscriber is published to make expected nearby contacts aware.

17. The system of claim 10, wherein the server is further configured to alert the subscriber regarding the subset of expected nearby contacts based on a future itinerary of the subscriber.

* * * * *